March 13, 1962  C. E. ATKINS ET AL  3,025,434
TOUCH RESPONSIVE SYSTEM
Filed July 5, 1960
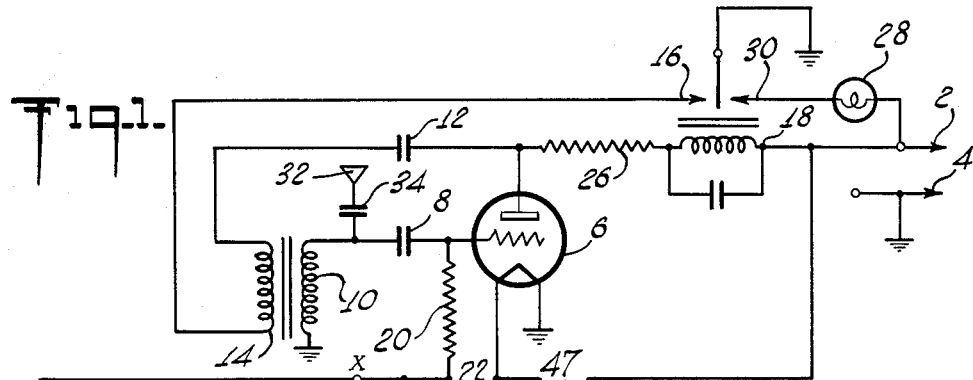
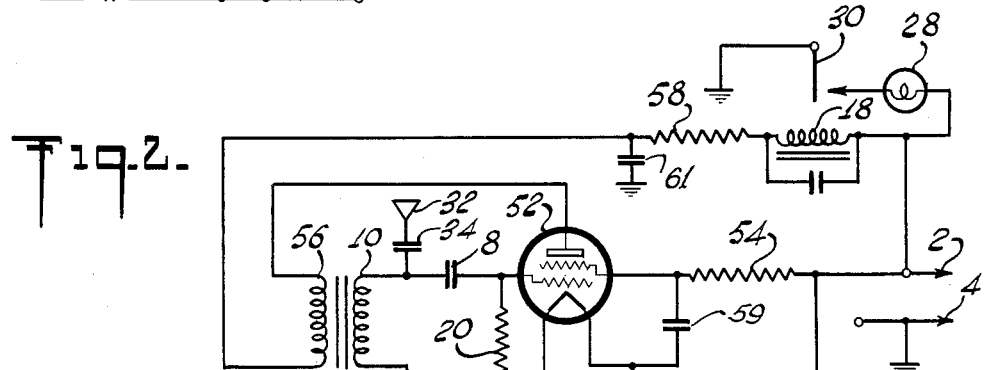
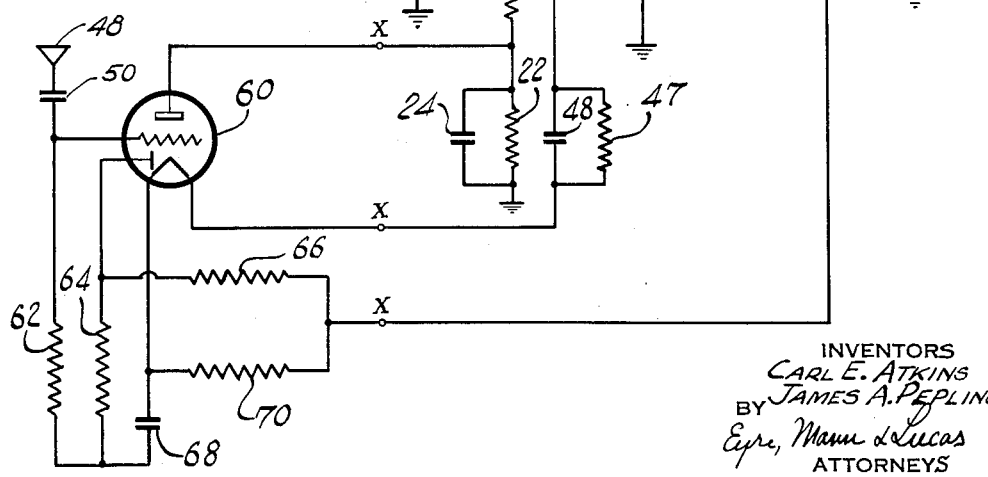
INVENTORS
CARL E. ATKINS
JAMES A. PEPLING
BY
Eyre, Mann & Lucas
ATTORNEYS

United States Patent Office 3,025,434
Patented Mar. 13, 1962

3,025,434
TOUCH RESPONSIVE SYSTEM
Carl E. Atkins, West Orange, and James A. Pepling, Bound Brook, N.J., assignors to Tung-Sol Electric Inc., a corporation of Delaware
Filed July 5, 1960, Ser. No. 40,826
9 Claims. (Cl. 317—146)

The present invention relates to touch controlled circuits and comprises a novel control circuit of this type which consumes but little power during standby conditions, which requires few elements and which is positive in action. The invention is particularly adapted for use for control of lighting circuits such as the circuit of a table or floor lamp or the lighting circuits controllable by the usual wall switches. When a table lamp or the like is to be lighted in a darkened room, the invention provides means whereby merely touching a relatively large area of the lamp fixture will close the circuit for the lamp bulb. To extinguish the light the invention provides electronic means whereby another part of the fixture is touched. Circuits heretofore proposed for closing light circuits by contact with a relatively large area ordinarily employed a stepping relay so that the light is extinguished upon a second touching of the same area. Such arrangement is undesirable for various reasons. Once a lamp is lighted in such type of system accidental touching of the area would turn off the light. Also stepping relays are relatively expensive and require substantial space. They also consume substantial power.

In accordance with the invention there is provided a self-blocking oscillatory circuit which is coupled to the area to be touched when the light is to be turned on and which, when such area is touched, is rendered quiescent, the increased current through the tube of the oscillatory circuit when oscillation is quenched energizing a relay to close the lighting circuit. This type of oscillatory circuit provides a large ratio between the relay current during quiescence and the relay current during oscillation and therefore insures positive action of the relay. A second touch controlled circuit, which may or may not be that of a self-blocking oscillator, and which may be substantially remote from the first circuit controls the grid potential of the tube of the first oscillatory circuit to cause it to resume oscillation and thereby open the lamp circuit. Associated with the second circuit is the area which when touched changes the condition of such second circuit to control the grid potential of the tube of the first oscillatory circuit.

For a better understanding of the invention and of circuits embodying the same reference may be had to the accompanying drawing of which:

FIG. 1 is a diagram of a circuit embodying the invention in which two oscillatory circuits are employed; and FIG. 2 is a similar circuit diagram embodying the invention in which there is one oscillatory circuit and one non-oscillatory circuit.

In FIG. 1 alternating current power lines which may be the usual 110 volt 60 cycle household wiring supply lines are indicated at 2 and 4, line 4 being the grounded line. A triode 6 is connected in an oscillatory circuit of the self-blocking type. For this purpose the control grid of the tube 6 is connected through a capacitor 8 and tank coil 10 to line 4 (represented by the ground symbol) and the anode of tube 6 is connected through a capacitor 12 and tickler coil 14 to ground through the back contact 16 of a normally deenergized relay 18. The control grid of the tube is connected to ground through two series connected resistors, 20 and 22, resistor 22 being bridged by a capacitor 24. The anode of tube 6 is connected through a dropping resistor 26 and the winding of relay 18 to the ungrounded power line 2. A lighting circuit, symbolized by a lamp 28, is connected between the line 2 and the front contact 30 of the relay 18 so as to be normally open at that contact and closed over the grounded armature when the relay is actuated.

With the above described circuit and with the relay unactuated, when line 2 starts to become positive with respect to ground, the circuit will burst into radio frequency oscillation. The amplitude of the oscillations grows with the increasing positive potential of line 2 and the grid of tube 6 is driven negative by electrons which accumulate in capacitor 8 at a rate too high for dissipation through resistors 20 and 22. This negative potential on the grid ultimately blocks the radio frequency oscillation. When the negative charge leaks off, oscillation is resumed if the anode of tube 6 is still, or again, positive with respect to the cathode. The repetition rate of the bursts of radio frequency oscillation depends upon the time constant of the circuit as determined by the values of the grid leak resistance and the grid capacitor. Preferably these values are so chosen as to yield but one short burst of radio frequency oscillation during each positive half cycle of the applied anode potential. The frequency of the oscillation is, of course, determined by the inductance and capacity of the feedback circuit.

When the circuit is operating as above described, the average grid potential is so low that only a small current of the order of 20 microamperes, flows through the tube, and such current is insufficient to actuate the relay. In order to actuate the relay, means are provided for quenching oscillation in the tube circuit. These means comprise an area, indicated symbolically as an antenna 32, capacitatively coupled through a condenser 34 to the grid circuit of tube 6. When the antenna 32, which may and preferably is, a large area such as the rim of a lamp standard, is touched by the hand the oscillatory circuit is loaded and ceases to oscillate. As a result the charge on capacitor 8 is dissipated and the potential of the control grid rises permitting increase in current through tube 6. The increase in current through the tube causes actuation of the relay which picks up its armature to close the circuit of lamp 28 and open that of tickler coil 14. The circuit will then remain in quiescent condition with the lighting circuit closed irrespective of whether or not the antenna 32 is retouched.

The initial condition of the circuit will be restored if a negative potential is impressed on the control grid of tube 6. The particular means shown in FIG. 1 for applying such negative potential to the control grid of tube 6 comprises a second oscillatory circuit including a triode 36 connected as a self-blocking oscillator. The control grid of tube 36 is connected through a capacitor 38 and tank coil 40 to the filamentary cathode of the tube and the anode of the tube is connected through the tickler coil 42 to the junction of resistors 20 and 22. A high grid bias resistor 44 is connected between the grid of tube 36 and the cathode of the tube. Each of the tubes 6 and 36 are of the filamentary cathode type and these filamentary cathodes are connected in series across the lines 2 and 4, a condenser 46 of large capacity, say one microfarad, being inserted in the circuit between the two cathodes. A resistor 47 is bridged across the condenser 46. This arrangement permits direct energization of the filaments from the power supply with consumption of small power due to the reactive impedance of the condenser 46. The resistor 47 provides for discharge of the condenser when the system is disconnected from the power lines and thus avoids possible surge of current through the filament upon reconnection to the lines. The cathode of tube 6 is at the potential of the grounded lead 4 whereas the cathode of tube 36 is at the potential of the ungrounded power line 2.

The circuit including tube 36 will normally oscillate as described in connection with the circuit of tube 6 and will continue to so oscillate irrespective of whether or not the circuit including tube 6 is oscillating. However, when the circuit including tube 36 is loaded, as by touching an area indicated symbolically as an antenna 48 that is capacitatively coupled through a condenser 50 to the control grid of tube 36, oscillation will be quenched and the grid potential will rise allowing the tube to pass relatively high current during the half cycles when the ungrounded power line 2 is negative with respect to ground. This curent flows through resistor 22 to ground placing a high negative potential on the grid of tube 6 and accordingly reducing the current through that tube sufficiently to cause the relay 18 to release. In releasing, the armature of the relay opens the lighting circuit and completes the oscillatory circuit of tube 6 whereupon the circuit of that tube resumes oscillation.

In FIG. 2 a different type of auxiliary circuit for controlling the potential of the grid of the tube of the main oscillatory circuit is employed. The particular oscillatory circuit of FIG. 2 also differs in some respects from that of FIG. 1. Like elements in the two figures are identified by like reference numerals. In the oscillatory circuit of FIG. 2 a tetrode 52 is employed rather than the triode 6 of FIG. 1. Such a tetrode cannot function efficiently as an amplifier or oscillator when its plate potential falls substantially below that of its screen grid. Accordingly, when oscillation of the circuit including the tube 52 is quenched, the circuit will remain quiescent so long as the anode potential is maintained below that of the screen grid. A resistor 54 is connected between the screen grid and ungrounded power line 2 to maintain the screen grid potential normally high. The anode of tube 52 is connected through a tickler coil 56, a load resistor 58 and winding of relay 18 to power line 2. A capacitor 59 is connected between the screen grid and ground and a capacitor 61 is connected between the anode side of resistor 58 and ground. When small current passes through the tube 52 the anode potential is high and the circuit oscillates whereas when a high current is drawn by the tube 52 the low plate potential, due to the current flowing through the load resistor 58, prevents the tube from acting as an oscillator. The control grid of tube 52 is connected as in the circuit of FIG. 1 through capacitor 8 and tank coil 10 to ground and the antenna 32 is connected through capacitor 34 to the grid circuit. The control grid is returned to ground through the series connected resistors 20 and 22 as in the circuit of FIG. 1. When the antenna 32 is touched the circuit is loaded and oscillation is suppressed. Accordingly current through the tube 52 increases to energize the relay and close the circuit of lamp 28 over the front contact of the relay. The relay will remain energized and the circuit quiescent because of reduction of potential at the anode of tube 52 to a value below that of the screen grid of the tube. As in the embodiment of the invention of FIG. 1 application of negative potential to the junction of resistors 20 and 22 reduces the current through the tube and restores oscillation with concomitant release of the relay.

The particular auxiliary circuit of FIG. 2 which provides the control of the potential at the junction of resistors 20 and 22 is not an oscillatory circuit. It comprises a diode-triode tube 60 the anode of which is connected to the junction of resistors 20 and 22 and the control grid of which is connected through series connected resistors 62, 64 and 66 to line 2. The diode anode of the tube is connected to the junction of resistors 64 and 66. A condenser 68 is connected between the junction of resistors 62 and 64 and the filamentary cathode of tube 60. The cathode is energized as is the cathode of tube 36 of FIG. 1 except that a resistor 70 is interposed in the line connecting the filamentary cathode to the ungrounded power line 2.

When line 2 is negative with respect to ground current would flow through tube 60 to ground through resistor 22 if the bias on the control grid of tube 60 were such as to permit current flow. Tube 60, however, is normally blocked, as will be apparent from the following considerations. The resistor 70 provides a few volts drop between the line 2 and the cathode whereas the diode anode will be at the potential of the line. Accordingly negative pulses will appear at the diode-anode and these will be filtered by the network comprising resistor 64 and condenser 68. A negative direct current bias is thus supplied to the control grid of tube 60 through resistor 62. This latter resistor is quite high being anywhere from 20 megohms to 100 megohms. Under these conditions, therefore, tube 60 will be blocked because of the high negative potential on the control grid thereof. The antenna 48 which is coupled through capacitor 50 to the control grid of tube 60 provides the means for unblocking the tube 60. Because of the high impedance of resistor 62 a person touching antenna 48 will inject an appreciable signal on the tube 60. During the positive excursion of the signal, tube 60 will conduct and current will accordingly flow through the tube. The capacitor 24 is in parallel with the resistor 22 so that undulating negative pulses applied across this condenser are smoothed out to some extent giving a substantial negative kick to the grid of tube 52 through the resistor 20. Thus in this embodiment of the invention the auxiliary circuit includes a normally blocked non-oscillatory tube which when unblocked impresses negative potential on the control grid of the oscillatory circuit to restore oscillation of the circuit.

The invention has now been described in connection with two embodiments. Obviously various changes in the described circuits can be made without departing from the spirit of the invention or the scope of the accompanying claims. Although two specifically different main oscillatory circuits have been shown coupled to different auxiliary circuits, either the auxiliary circuit of FIG. 1 or that of FIG. 2 could be employed with either of the specific main oscillatory circuits. For this reason in each of the drawings an "X" is applied to the lead connecting the anode of the auxiliary tube with the junction of resistors 20 and 22, to the lead connecting the filamentary cathode of the auxiliary tube to the condenser 46 and to the lead from the ungrounded power line 2 to the cathode circuit of the auxiliary tube. The "X's" are intended to indicate that the part of the circuit of FIG. 1 to the right of each "X" could be combined with the part of the circuit of FIG. 2 to the left of each "X" and similarly the part of the circuit of FIG. 1 to the left of each "X" could be combined with the part of the circuit of FIG. 2 to the right of each "X."

The following is claimed:

1. A touch responsive system comprising in combination a normally oscillating circuit including an electronic tube having an anode, at least one grid and a cathode, a source of alternating current power, a relay having a winding connected in series with said tube across said source, said tube, when said circuit is oscillating, passing insufficient current to actuate said relay and when oscillation is suppressed passing current sufficient to actuate the relay, a normally deenergized circuit, means responsive to actuation of said relay for connecting said last mentioned circuit across said source, touch responsive means coupled to said grid for loading said circuit for suppression of oscillation thereof, an auxiliary circuit coupled to said grid and including a second touch responsive means for reducing the potential of the grid and thereby restoring oscillation of said oscillatory circuit.

2. The system according to claim 1 wherein the grid of said tube is connected to the cathode thereof through two series connected resistors and wherein said auxiliary circuit is connected to the junction of said resistors.

3. The system according to claim 2 wherein said auxiliary circuit is also a normally oscillating circuit and also includes an electronic tube having a cathode, an anode and a grid, said second touch responsive means being coupled to the grid of said last mentioned tube for suppression of oscillation of the auxiliary circuit and the anode of said last mentioned tube being connected to the junction of said resistors to reduce the potential of the grid of said first mentioned tube when said auxiliary circuit is rendered quiescent.

4. The system according to claim 1 wherein the cathode of said tube is a filamentary cathode and wherein said auxiliary circuit also includes an electronic tube having a filamentary cathode, said cathodes being connected in series with a capacitor across said source.

5. The system according to claim 4 wherein said last mentioned tube is a diode-triode having a main anode, a diode-anode and a control grid for controlling conduction between the cathode and main anode, a filter network coupling said diode-anode and said control grid for maintaining said control grid at cut-off potential when said second touch responsive means is not touched and a pair of series connected resistors connecting the grid of said first mentioned tube to the cathode thereof, the main anode of said second mentioned tube being connected to the junction of said resistors, whereby, when said second mentioned tube conducts, the potential of the grid of said first mentioned tube is made negative with respect to the cathode thereof.

6. The system according to claim 5 wherein a resistor is connected between the filamentary cathode of said second tube and said source.

7. The system according to claim 1 wherein the cathode of said tube is a filamentary cathode and wherein said auxiliary circuit also includes an electronic tube having a filamentary cathode, said cathodes being connected in series with a capacitor across said source, a high resistor being bridged across said capacitor for discharge thereof when the system is disconnected from said source.

8. The system according to claim 1 wherein said relay, when actuated, opens said oscillatory circuit to prevent restoration of oscillation so long as the tube passes current sufficient to maintain the relay actuated.

9. The system according to claim 1 wherein said tube includes a second grid, means including a resistor connecting said last mentioned grid to said source to maintain the same at a potential above that of the anode when said tube is conducting after suppression of oscillation and thereby preventing restoration of oscillation of the circuit so long as the tube passes current sufficient to maintain the relay actuated.

References Cited in the file of this patent

UNITED STATES PATENTS

| | | |
|---|---|---|
| 1,905,332 | Barbulesco | Apr. 25, 1933 |
| 1,951,409 | Havenner et al. | Mar. 20, 1934 |
| 2,390,221 | Lindsay et al. | Dec. 4, 1945 |
| 2,695,402 | Gray | Nov. 23, 1954 |
| 2,704,339 | Westcott et al. | Mar. 15, 1955 |
| 2,732,545 | Passow et al. | Jan. 24, 1956 |
| 2,810,066 | Green | Oct. 15, 1957 |